United States Patent [19]
Thompson et al.

[11] Patent Number: 5,268,009
[45] Date of Patent: Dec. 7, 1993

[54] PORTABLE AIR FILTER SYSTEM

[75] Inventors: Paul M. Thompson; William L. Wood, both of Fort Collins, Colo.

[73] Assignee: Teledyne Industries, Inc., Fort Collins, Colo.

[21] Appl. No.: 995,153

[22] Filed: Dec. 22, 1992

[51] Int. Cl.⁵ .............................................. B03C 3/01
[52] U.S. Cl. ........................................ 96/67; 55/497; 55/DIG. 39
[58] Field of Search ................. 55/DIG. 39, 124, 126, 55/131, 155, 360, 151

[56] References Cited

U.S. PATENT DOCUMENTS

| | | | |
|---|---|---|---|
| Re. 31,285 | 6/1983 | Turnhout et al. | 55/155 |
| 2,593,869 | 4/1952 | Fruth | 55/151 |
| 2,822,058 | 2/1958 | Roos et al. | 55/131 |
| 2,945,557 | 7/1960 | Powers | 183/151 |
| 3,307,332 | 3/1967 | Grace et al. | 55/126 |
| 3,735,560 | 5/1973 | Wellman | 55/129 |
| 3,744,216 | 7/1973 | Halloran | 55/102 |
| 3,853,529 | 12/1974 | Boothe | 55/499 |
| 3,988,131 | 10/1976 | Kanazawa et al. | 55/126 |
| 3,999,964 | 12/1976 | Carr | 55/138 |
| 4,133,652 | 1/1979 | Ishikawa et al. | 55/126 |
| 4,133,653 | 1/1979 | Soltis | 55/126 |
| 4,219,420 | 8/1980 | Muller | 210/82 |
| 4,376,642 | 3/1983 | Verity | 55/105 |
| 4,662,903 | 5/1987 | Yanagawa | 55/126 |
| 4,707,167 | 11/1987 | Saito et al. | 55/267 |
| 4,750,921 | 6/1988 | Sugita et al. | 55/132 |
| 4,878,930 | 11/1989 | Manniso et al. | 55/493 |
| 4,886,527 | 12/1989 | Fottinger et al. | 55/DIG. 39 |
| 4,940,470 | 7/1990 | Jaisinghani et al. | 55/132 |
| 4,976,753 | 12/1990 | Huang | 55/124 |
| 5,034,032 | 7/1991 | Yikai et al. | 55/124 |
| 5,035,728 | 7/1991 | Fang | 55/126 |

FOREIGN PATENT DOCUMENTS

| | | | |
|---|---|---|---|
| 3802748 | 8/1989 | Fed. Rep. of Germany | 55/155 |
| 136114 | 8/1984 | Japan | 55/360 |

Primary Examiner—Charles Hart
Attorney, Agent, or Firm—Dean P. Edmundson

[57] ABSTRACT

A portable air filter system is described for use in the home, offices, or other areas where it is desired to remove airborne particulate matter from the air. The air filter system includes an enclosure having an air inlet and outlet areas, removable air filter which is grounded, a fan for moving air from the inlet to the outlet through the filter, and an ionizer for supplying negative ions to the air exiting through the outlet. The filter includes electrostatically charged fibrous material in a removable cartridge.

14 Claims, 5 Drawing Sheets

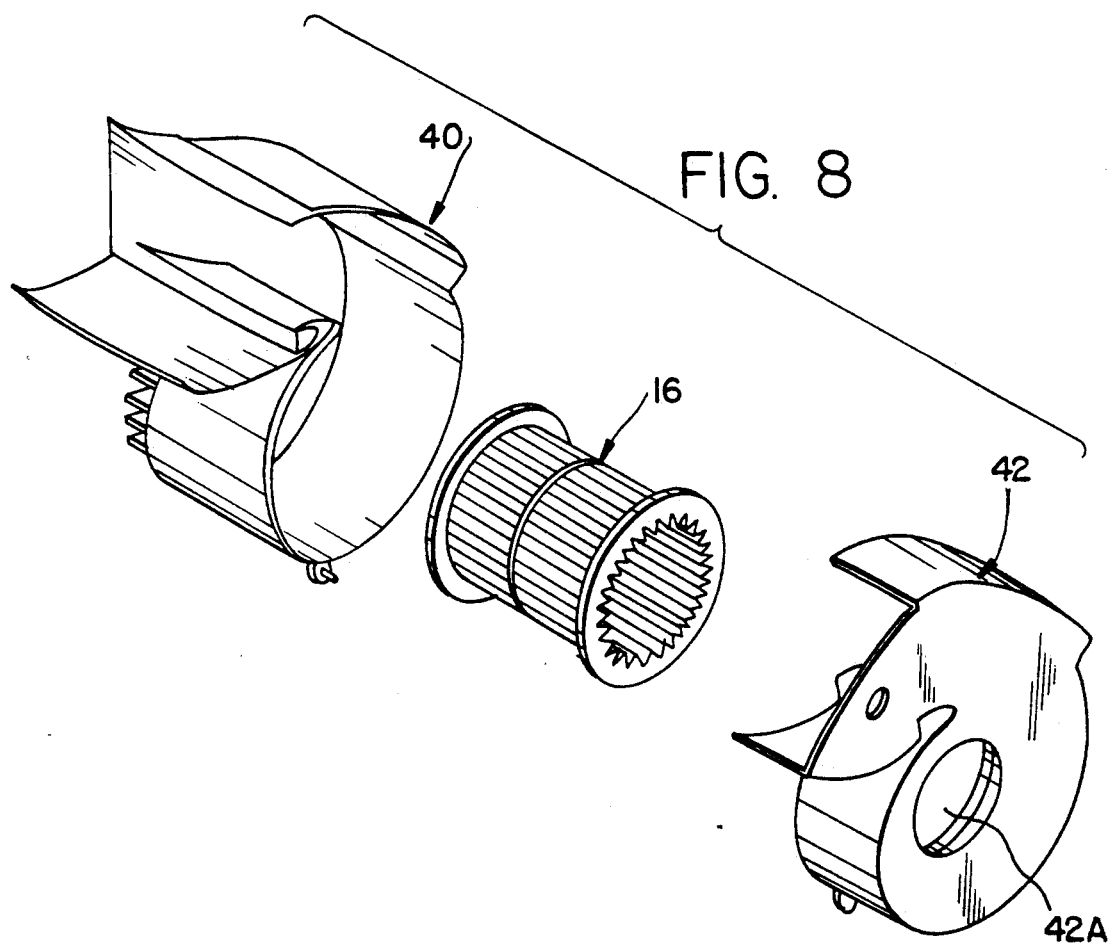

PORTABLE AIR FILTER SYSTEM

FIELD OF THE INVENTION

This invention relates to filter systems for removal of airborne particulate matter. More particularly, this invention relates to portable air filter systems for use in the home, office or other area where it is desired to remove particulate matter from the air. Even more particularly, this invention relates to air filter systems utilizing a fibrous filter medium in combination with ionizing means for supplying negative ions to the air.

BACKGROUND OF THE INVENTION

Many types of air filtering systems and devices have been used previously for removing airborne particulate matter. Some of such systems are large and bulky and are not generally intended for use in offices or other areas where they may have to be moved occasionally.

Although so-called "table-top" air cleaners have been previously available, they generally are not very effective in trapping air borne particulate matter. Their collection rates typically drop rapidly over time. Air cleaners which use metal plates as collectors lose efficiency unless the plates are kept very clean. Also, such prior devices have the potential to generate ozone, which is very undesirable. They also are noisy in operation if they are capable of moving very much air through them. On the other hand, if they do not move very much air through them, then they cannot be very effective in removing particulate matter from the room in which they are used.

Some prior air cleaners utilize sharp metal needles in their ionizer system. The needles require periodic cleaning. They also decrease in efficiency with the passage of time. Further, the needles are sharp and present a safety hazard.

The air cleaner described in U.S. Pat. No. 4,376,642 (Verity) does not provide a self-contained filter module. Rather, a filter sheet is laid over a corrugated filter carrier secured to the frame of the air cleaner. In order to put in a fresh filter sheet, the dirty filter sheet must be lifted off the carrier and discarded. This is a messy and cumbersome task, and the dirty filter sheet is unsupported when it is removed from the carrier. Installation of a fresh filter sheet is also difficult, and air will leak around the edges of the filter sheet if it isn't properly installed.

Further, the ionizer in the Verity device is a needle which is located externally of the air cleaner housing. Also, the air cleaner does not include sound suppression features to quiet the operation of the air cleaner.

Another air cleaner is described in U.S. Pat. No. 3,999,964 for use in combination with a forced air heating system. It is not a portable air cleaner, but rather it is intended to be installed in the return duct system upstream from the inlet to the furnace. The cleaner includes an electrostatic cell having an ionizing section and a collecting section. In the ionizing section, foreign particles in the air pass through electrostatic fields to obtain an electrostatic charge. Then the charged particles are withdrawn from the air stream by the collector section. A foraminous filter media is positioned between the ionizing section and the collector section. The filter media is not electrostatically charged nor is it grounded.

There has not heretofore been provided a portable air filter system which is highly efficient and quiet in operation.

SUMMARY OF THE PRESENT INVENTION

In accordance with the present invention there is provided an air cleaner filter system which is portable and very quiet in operation. It is also very efficient in removing airborne particulate matter (e.g., tobacco smoke, dust and pollen).

In a preferred embodiment the air filter system comprises:

(a) an enclosure having air inlet means and air outlet means and defining a path between the inlet and outlet means;

(b) removable air filter means in the path for filtering air between the inlet and outlet means; wherein the filter means comprises electrostatically charged fibrous filter medium in a removable cartridge; wherein the filter medium is grounded by means of a conductive grid in contact with the filter medium;

(c) fan means for moving air through the path from the inlet means to the outlet means; and (d) ionizer means adjacent the outlet means for supplying negative ions to air exiting the outlet means.

The filter means preferably comprises electrostatically charged plastic fibers (e.g., Filtrete brand fibrous material which is commercially available from 3M). No pre-filter is required.

The ionizer is located within the enclosure adjacent the outlet means for supplying negative ions to air exiting the outlet. The ions charge foreign particles in the air. As a result, when the charged foreign particles are drawn into the inlet of the system, the particles are retained on the filter medium. Because the filter medium is electrically grounded, build up of electrical charges on the filter medium is avoided. Consequently, the filter medium is more efficient in removing foreign particles from the air than would be observed if the filter medium was not grounded electrically.

The portable filter system also includes sound reduction features so as to render operation of the system very quiet for use in the home or office.

Other advantages of the filter system of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 8 is an exploded view showing one of the blowers and associated blower enclosure components.

DETAILED DESCRIPTION OF THE INVENTION

Figure 1:
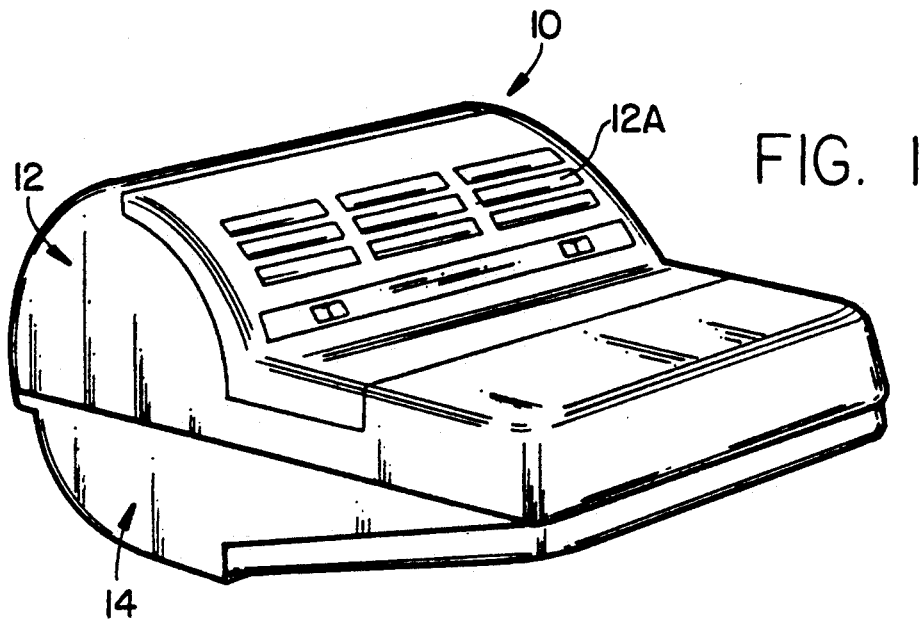
FIG. 1 is a front perspective view of a preferred embodiment of an air filter system of the invention.
Figure 2:
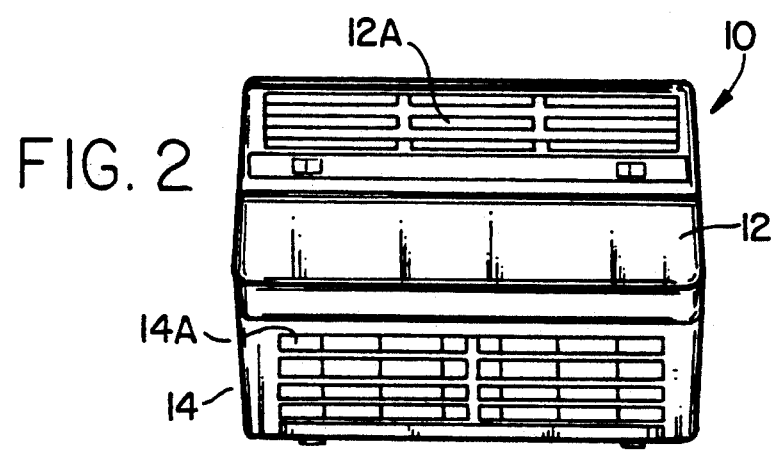
FIG. 2 is a front elevational view of the embodiment shown in FIG. 1.
Figure 3:
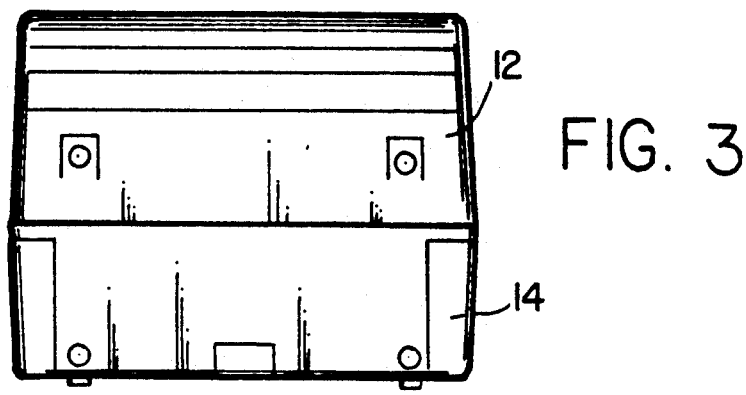
FIG. 3 is a rear elevational view of the embodiment shown in FIG. 1.

In the drawings there is illustrated a preferred embodiment of air cleaner filter system 10 of the invention. It comprises an enclosure or housing having connected upper and lower portions 12 and 14, respectively. An air inlet 14A is provided in the lower portion, and an air outlet 12A is provided in the upper portion. The enclosure defines a path for air to proceed through the enclosure from the inlet to the outlet.

One or more fans or blowers 16 in the enclosure cause air to be drawn in through the inlet and pushed out through the outlet. Each fan is driven by an electric motor 18 which is preferably supported within the enclosure through rubber grommets 20 or other such resilient cushion material to reduce or prevent vibration of the motor from passing to the enclosure. This feature greatly reduces the noise and vibration which otherwise would be apparent during operation of the system.

The blower 16 is mounted on, and supported solely by, the output shaft 22 of the motor. This feature also reduces noise and vibration which otherwise would be imparted to the enclosure during operation. As shown in the drawings, there may be more than one output shaft 22, and a separate blower or fan can be mounted on each shaft. The motor preferably can be operated at more than one speed.

Positioned adjacent the air inlet in the apparatus is a removable filter cartridge 30. The filter cartridge is positioned in the air path between the inlet area and the fan or blower.

The self-contained filter cartridge is intended to be removable so that it can be easily and efficiently replaced, when desired, with a fresh filter cartridge. Preferably the filter cartridge comprises a filter medium 32 supported in an open frame member 34. The filter cartridge is shown in FIG. 5 and can also be seen in FIG. 4.

Preferably the filter medium in the filter cartridge comprises a sheet of electrostatically charged plastic fibers (e.g., polypropylene). A particularly useful filter medium is commercially available from 3M under the name "Filtrete" and is described in U.S. Pat. No. 3,998,916 and Reissue Patent 30,782, incorporated herein by reference.

This material is electrostatically charged when it is in the form of a thin sheet (approximately 10 microns thick). This thin film of polypropylene is heated to a temperature just above the Curie point where it is subjected to an electrical charge. The Curie point is the temperature at which adjacent atoms and molecules in a material lose their coupling of magnetic moments and become paramagnetic or free to associate with external field forces. Under these conditions, the crystalline structure of the material is free to align itself with the electric field lines being induced. It is then cooled while under the influence of this electric field, thus locking the crystalline structure in an orientation corresponding to that of the applied voltage.

The thin film material is now in a state where it is permanently polarized and has one side of positive charge and the opposing side being negative. The large sheets of charged polypropylene are then shredded into very fine rectangular strips approximately 70 microns wide by 6 cm long. Each individual fiber maintains polarized surfaces but the electrostatic properties are enhanced by charge concentrations which accumulate in areas of high curvature, namely the corners and edges of the fiber. These fibers are then blown into a nonwoven fabric of varying thickness depending upon the application.

This fabric contains millions of randomly oriented fibers which act as a means for mechanical filtration. In addition to the mechanical removal of particulate, the individual fibers maintain edges and corners of high charge concentration. Acting as microscopic magnets for charged or polarized contaminants, the per-pass efficiency of the fabric is greatly increased.

The filtration in the system of this invention is enhanced even further with the introduction of an external ionizing source which charges the particulate matter in the air before entering the filter stage. The addition of this particulate charge increases the electrostatic attraction between the filter and contaminant, thus boosting capture rates in the filter medium. The enhanced filtration efficiency produced by the electrostatic charging of the media is very desirable and effective.

Due to the fact that the external ionizing source is limited to negative charge only, the filter media will collect particulate which are predominately saturated with negative ions. This leads to an overall accumulation of negative charge in the filter assembly and thus tends to repel additional negatively-charged particulates. To eliminate this phenomenon, a conductive grid 36 is adhered as a backing on one side of the filter media and is connected to electrical ground. The grid may be, for example, expanded metal, 0.010 inch gauge, tin-plated carbon steel and is connected to ground by means of conductive aluminum foil tape 38. The foil which is adhered to the expanded metal with conductive adhesive is contacted on the outside of the filter assembly by means of a metal spring 50 (shown in dotted lines) in the air cleaner housing which is attached directly to line ground by means of wire 54 (shown in dotted lines). The spring and the wire are connected together and secured by screw 52 to the side of the enclosure adjacent the edge of the filter cartridge. This grounding mesh or grid acts as a drain for any accumulation of charge on the filter assembly, thereby enhancing the overall efficiency of the device. Other equivalent means for grounding the filter media may also be used, e.g., hardware cloth, a thin layer of steel wool, a plurality of spaced wires, etc. The grounding means must be in contact with the filter media. Preferably no portion of the filter media surface is more than about 0.5 inch from the grounding means.

Although not required, it is possible to ground both ends of the metal grid. Preferably the filter medium is corrugated, as illustrated.

The upper surface of the filter cartridge preferably includes a layer of foam 39 or similar porous material which is impregnated with activated charcoal to remove offensive odors.

The blower is almost completely surrounded around its periphery by a housing or enclosure as shown in the drawings. The housing includes mating sections 40 and 42 for enclosing the blower 16, as illustrated in FIG. 8. Section 42 includes an opening 42A in one side for receiving air which has passed through the filter 30. A similar opening is also present in the side of section 40 for receiving air. The housing is an expanding radius type, as shown. A similar housing is used for each blower.

As shown in the drawings, the forward portion of the housing includes an opening for the air to exit, whereupon the air passes out through the outlet in the enclosure. The blower is positioned such that it is not visible through the discharge opening in the forward portion of the housing. In other words, the blower is below the line of sight through the discharge opening. This also helps to reduce noise of operation.

Figure 4:
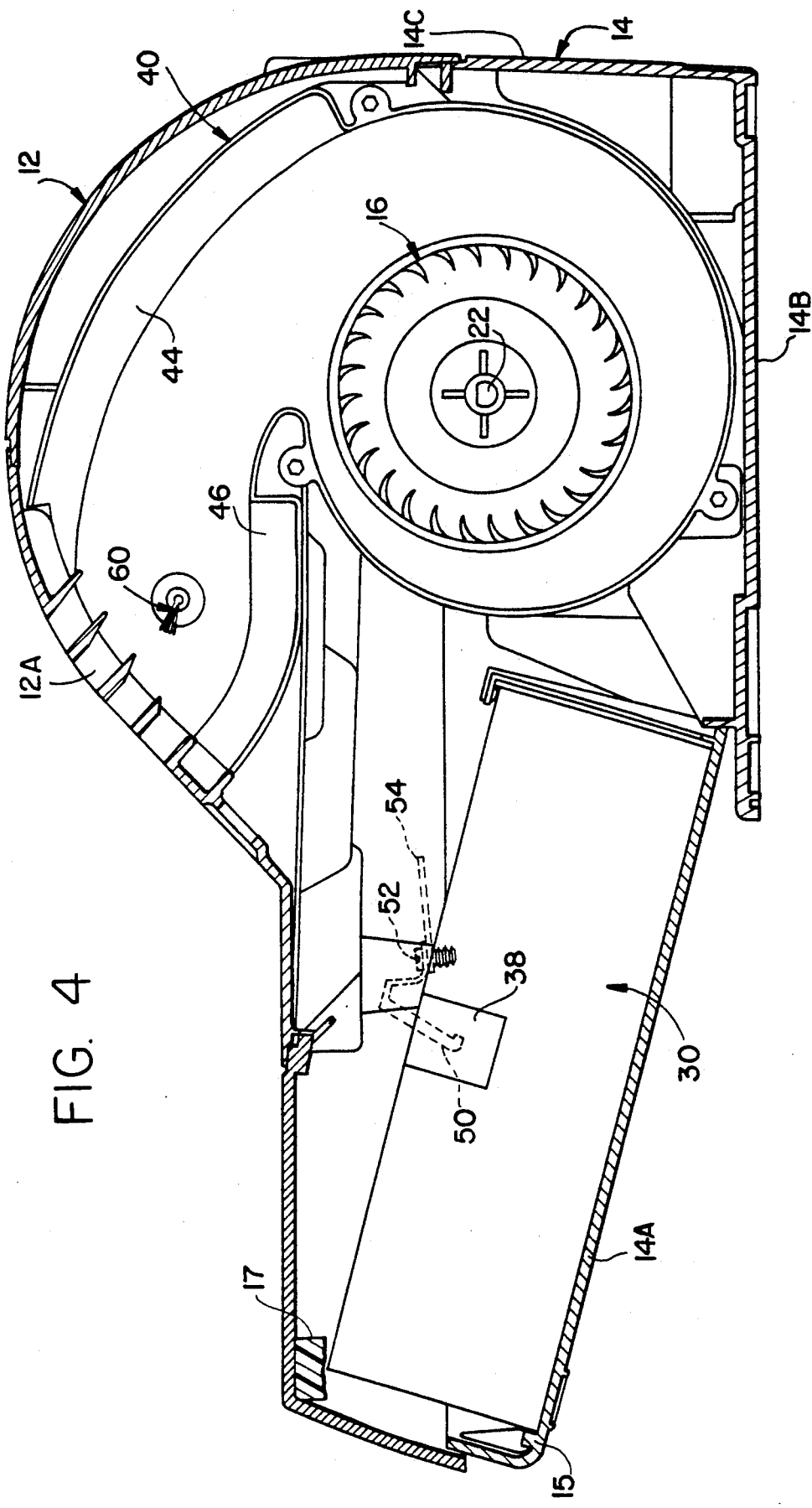
FIG. 4 is a cut-away view of the embodiment of air filter system shown in FIG. 1.
Figure 5:
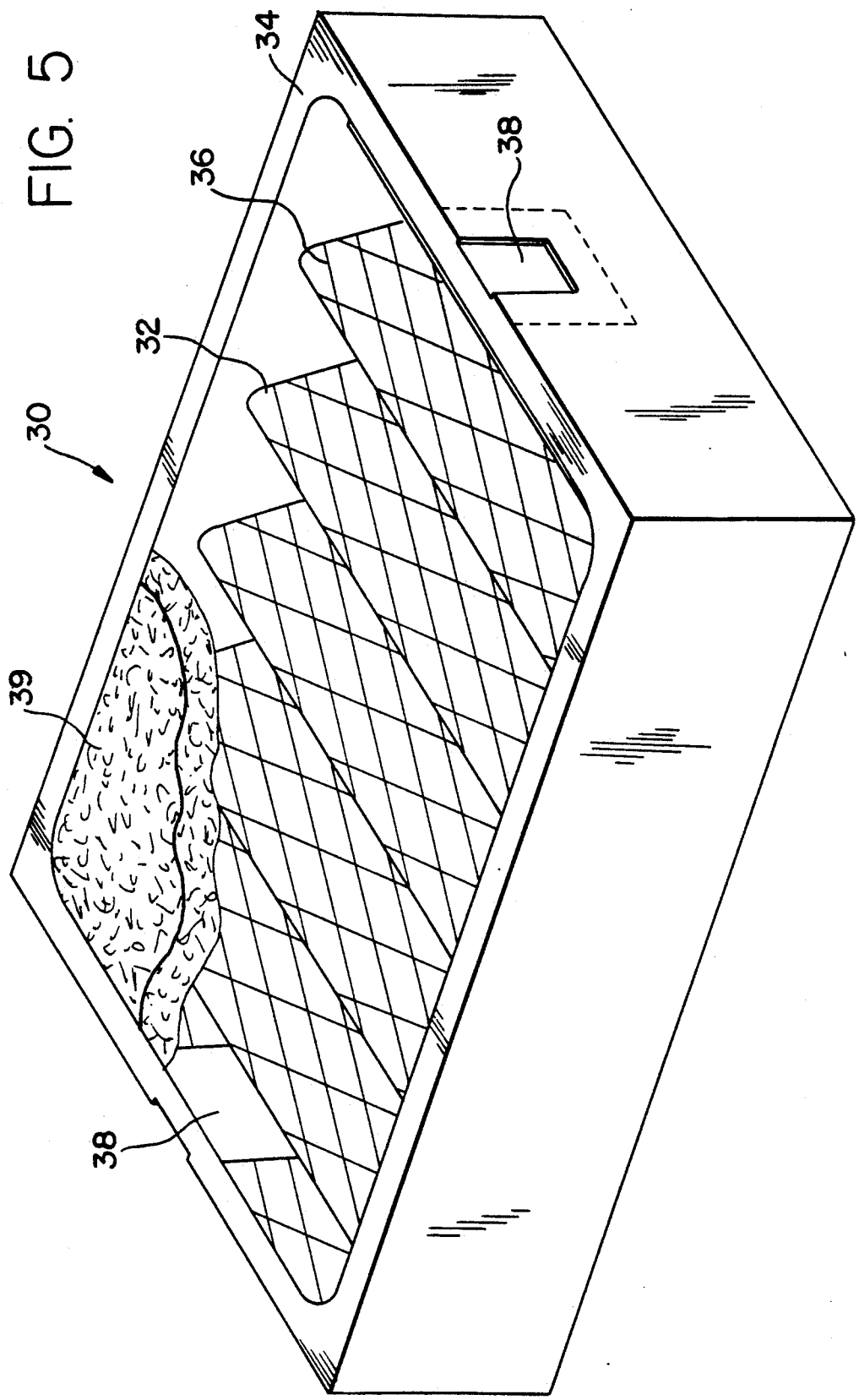
FIG. 5 is a perspective view of a preferred replaceable cartridge which is useful in the air filter system of the invention.
Figure 6:
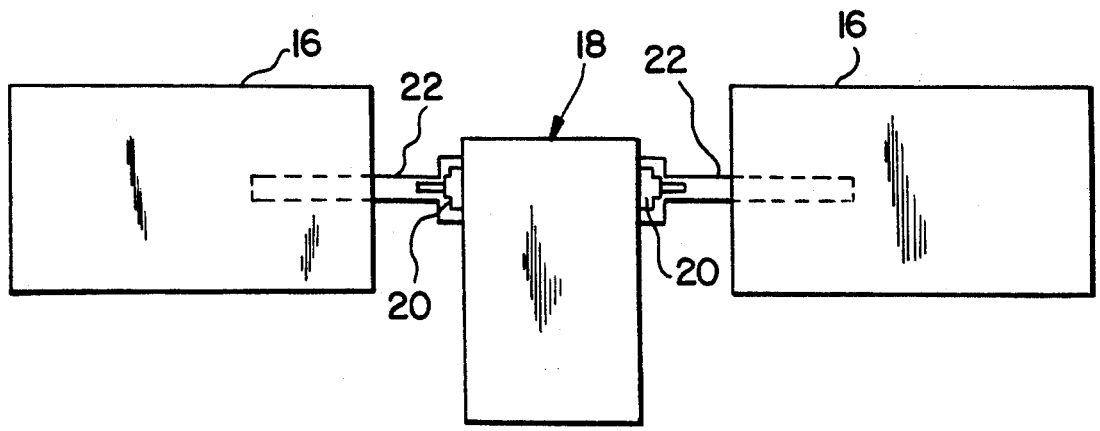
FIG. 6 is an elevational view showing a preferred manner for mounting the blowers in the embodiment shown in FIG. 1.

As shown in FIG. 4, the upper and lower portions of the blower housing 40 include recessed areas near the discharge opening in which there are disposed sound absorbing foam layers 44 and 46. These layers are approximately 0.5 inch thick and are very beneficial in reducing noise during operation of the air cleaner system. A preferred type of foam material which is used for this purpose is commercially available from Soundcoat as Soundfoam M Polyether Urethane Foam.

An ionizer 60 is positioned in the air stream, within the enclosure, adjacent the outlet in the upper portion 12 of the housing, as illustrated in FIG. 4. There may be more than one ionizer present, if desired. The ionizer is operably connected to a source of high voltage (e.g., about 5 kV to about 14.5 kV).

Figure 7:
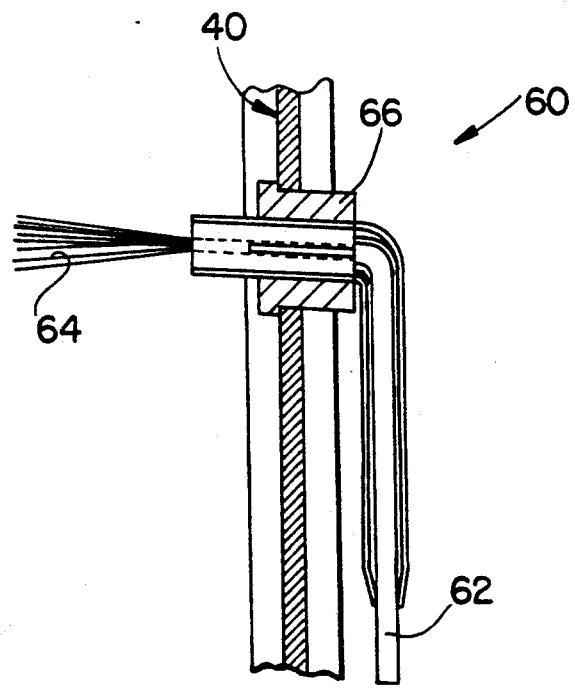
FIG. 7 is a cross-sectional view illustrating a preferred ionizer unit used in the air filter system.

A preferred ionizer means 60 for use in this invention is shown in FIG. 7. A conductor 62 is operatively connected to a source of electrical energy of high voltage. Preferably the conductor comprises fiberglass fibers 64 which have been surface treated to render them electrically conductive, wherein each such fiber has a diameter of about 10 microns. A fitting 66 secures the conductor to the side wall of the blower housing 40. A preferred conductor is commercially available from Carol Cable Company, Inc. Other types of plastic fibers could also be used (e.g., polyester) so long as they have been treated to render them electrically conductive.

Preferably the fibers are of very small diameter and exhibit a maximum resistance of about 7000 ohms per foot. Preferably there are hundreds of such fibers in the ionizer. The amount of current applied to the fibers is less than about 10 microamps, for safety purposes.

Preferably the ionizer means can be operated at more than one voltage at the option of the user. For example, for a low level of ionization, the ionizer may be operated at about 9 kV and for a high level of ionization, the ionizer may be operated at about 14 kV.

As shown in FIG. 4, the filter cartridge 30 is detachably retained in the front, lower portion of the housing of the air cleaner system and just above a grill inlet portion 14A. The grill portion is able to pivot downwardly when tab 15 at the front of the grill portion is released from a ledge on the side of the enclosure. This enables the filter cartridge to be easily and simply removed and replaced, when necessary. The foam strip 17 is carried by the underside of the enclosure portion 12 to assist in urging the filter cartridge against the grill portion.

Because the air enters the lower portion of the housing through grill 14A, this helps to reduce noise during operation. There is no line of sight to the blower through the air inlet.

Another unique feature of the air cleaner system of the invention is that it can be used in either a prone position (as shown in the drawings where the unit is resting on its bottom surface 14B), or it may be operated in an upright position where the unit is resting on its rear face 14C.

Also, the air outlet 12A is oriented such that air exiting the unit is directed upwardly at an approximate 45° angle. This helps to de-stratify the air in a room. Even when the unit is resting on its rear face 14C, the air exits the unit at 45°.

Other variants are possible without departing from the scope of the invention.

What is claimed is:

1. Portable air filter system comprising:
    (a) an enclosure having air inlet means and air outlet means and defining a path between said inlet and outlet means;
    (b) removable air filter means in said path for filtering air between said inlet and outlet means; wherein said filter means comprises electrostatically charged fibrous filter medium in a removable cartridge; wherein said filter means comprises electrostatically charged plastic fibers supported by an open frame; wherein said filter medium is corrugated and is grounded by means of a conductive grid in contact with and adhered to said filter medium; wherein said grid is in contact with said frame; and wherein said frame includes a conductive portion which is grounded in said enclosure;
    (c) fan means for moving air through said path from said inlet means to said outlet means; and
    (d) ionizer means adjacent said outlet means for supplying negative ions to air exiting said outlet means.

2. An air filter system in accordance with claim 1, wherein said plastic fibers comprise polypropylene.

3. An air filter system in accordance with claim 1, wherein said enclosure includes upper and lower portions; wherein said air inlet means is disposed in said lower portion and said air outlet means is disposed in said upper portion.

4. An air filter system in accordance with claim 3, wherein said ionizer means is disposed in said path between said fan means and said air outlet means, and wherein said ionizer means comprises conductive fibers operably connected a voltage source.

5. An air filter system in accordance with claim 1, wherein said fan means comprises a blower and an electrical motor including an output shaft; wherein said blower is supported solely on said output shaft.

6. An air filter system in accordance with claim 5, wherein said motor is supported within said enclosure by means of a cushion material.

7. An air filter system in accordance with claim 3, wherein said fan means is supported within a housing of the type having an expanding radius; wherein said housing includes a discharge opening forming said air outlet means.

8. An air filter system in accordance with claim 7, wherein said fan means is located below the line of sight through said discharge opening.

9. A portable air filter system comprising:
    (a) an enclosure including upper and lower portions; and further comprising air inlet means disposed in said lower portion and air outlet means disposed in said upper portion; wherein said enclosure defines a path between said inlet and outlet means;
    (b) removable air filter means in said path for filtering air between said inlet and outlet means; wherein said filter means comprises electrostatically charged plastic fiber filter medium in a removable cartridge having an open frame; wherein said filter medium is corrugated and is grounded by means of a conductive grid in contact with and adhered to said filter medium; wherein said grid is in contact with said frame; and wherein said frame includes a conductive portion which is grounded in said enclosure;

(c) fan means for moving air through said path from said inlet means to said outlet means; wherein said fan means is supported within a housing of the type having an expanding radius; wherein said housing includes a discharge opening forming said air outlet means; wherein said fan means comprises a blower and an electrical motor including an output shaft; wherein said blower is supported solely on said output shaft; and (d) ionizer means adjacent said outlet means for supplying negative ions to air exiting said outlet means; wherein said ionizer means comprises conductive fibers operably connected to a voltage source.

10. An air filter system in accordance with claim 9, wherein said ionizer means is disposed in said path between said fan means and said air outlet means.

11. An air filter system in accordance with claim 9, wherein said discharge opening includes upper and lower surfaces, and further comprising foam layers covering said upper and lower surfaces.

12. A portable air filter system comprising:
(a) an enclosure including upper and lower portions; and further comprising air inlet means disposed in said lower portion and air outlet means disposed in said upper portion; wherein said enclosure defines a path between said inlet and outlet means;
(b) removable air filter means in said path for filtering air between said inlet and outlet means; wherein said filter means comprises electrostatically charged fibrous filter medium in a removable cartridge; wherein said filter medium is grounded by means of a conductive grid in contact with said filter medium; and wherein said filter means comprises electrostatically charged plastic fibers supported by an open frame; wherein said grid is in contact with said frame; and wherein said frame includes a conductive portion which is grounded in said enclosure;

(c) fan means for moving air through said path from said inlet means to said outlet means; wherein said fan means comprises a blower and an electrical motor including an output shaft; wherein said blower is supported solely on said output shaft; and (d) ionizer means adjacent said outlet means for supplying negative ions to air exiting said outlet means; wherein said ionizer means is disposed in said path between said fan means and air outlet means, and wherein said ionizer means comprises conductive fibers operably connected to a voltage source.

13. An air filter system in accordance with claim 12, wherein said fan means is supported within a housing of the type having an expanding radius; wherein said housing includes a discharge opening forming said air outlet means; and wherein said fan means is located below the line of sight through said discharge opening.

14. An air filter cartridge comprising:
(a) an open frame including a conductive portion;
(b) an electrostatically charged fibrous filter medium spanning said open frame; wherein said filter medium is corrugated;
(c) a conductive grid in contact with and adhered to said filter medium; wherein said grid is in contact with said conductive portion of said frame.

* * * * *